United States Patent [19]

Lipinsky

[11] 3,712,638
[45] Jan. 23, 1973

[54] CONVEYANCE FOR TRANSPORTING OBJECTS WITH PROTRUDING LEGS

[76] Inventor: Frederick C. Lipinsky, 1424 North Penetaquit Avenue, Bay Shore, N.Y. 11706

[22] Filed: Sept. 16, 1970

[21] Appl. No.: 72,572

Related U.S. Application Data

[63] Continuation-in-part of Ser. No. 862,187, Sept. 30, 1969, abandoned.

[52] U.S. Cl. ................................................ 280/79.1
[51] Int. Cl. ............................................... B62b 5/00
[58] Field of Search......280/79.1, 79.2, 179 A, 47.34

[56] References Cited

UNITED STATES PATENTS

| 1,849,028 | 3/1932 | Robinson | 280/79.1 |
| 819,053 | 5/1906 | Firestone | 280/79.1 |
| 1,723,085 | 8/1929 | Sippel | 280/79.1 |

Primary Examiner—Benjamin Hersh
Assistant Examiner—Robert R. Song
Attorney—Andrew J. French

[57] ABSTRACT

A conveyance for transporting similar, multi-legged objects nested together with their legs received and secured by a retainer structure upon a moveable carriage.

3 Claims, 4 Drawing Figures

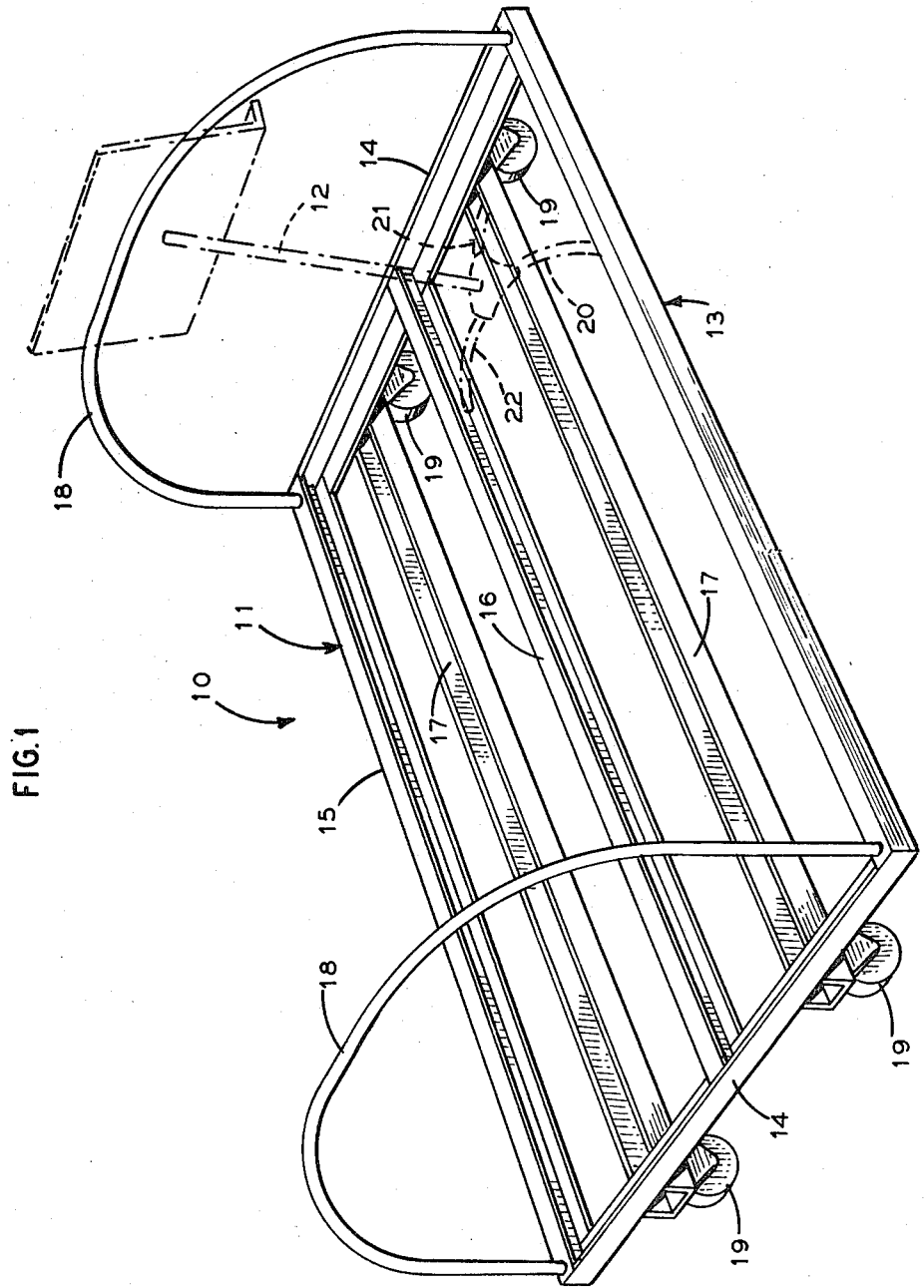

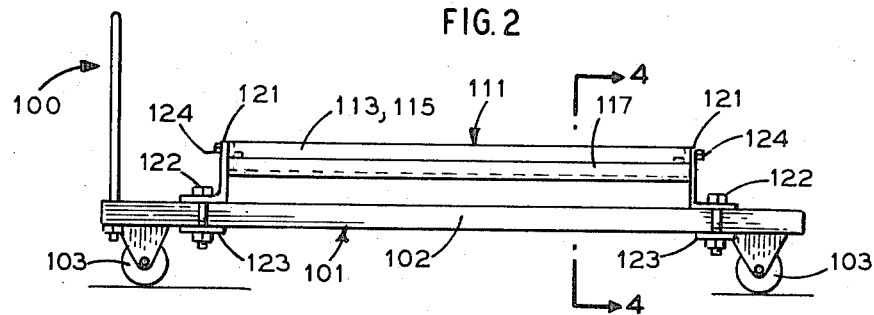
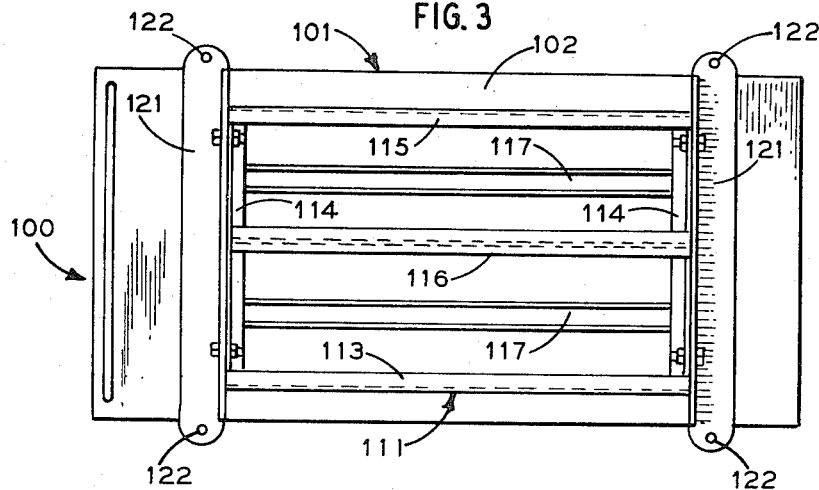
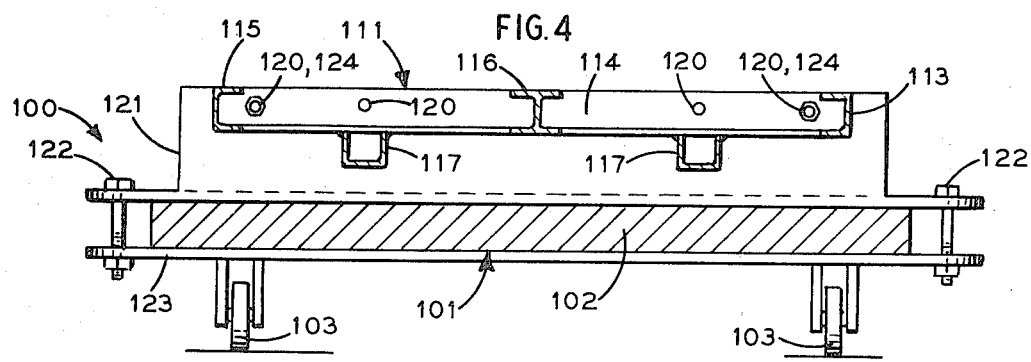

CONVEYANCE FOR TRANSPORTING OBJECTS WITH PROTRUDING LEGS

This application is a continuation-in-part of my earlier application for patent filed Sept. 30, 1969 as Ser. No. 862,187, now abandoned, and covering a dolly for music stands.

BACKGROUND AND SUMMARY OF THE INVENTION

The present invention relates in general to special-purpose conveyance vehicles, and more particularly to a conveyance for transporting similar multi-legged objects, such as music stands, nested together.

There are many known conveyance designs, both general-purpose and special-purpose, that are suitable for transporting a variety of different objects from one place to another. U. S. Pat. No. 1,723,085 issued to W. H. Sippel shows a wheeled truck that is adapted for a multiplicity of transport services. While there has been frequent need for transporting similar, multi-legged objects, as for example, a quantity of music stands equal to that required by a symphony orchestra, such needs have been fulfilled as best as possible using conventional, general-purpose conveyances because heretofore the prior art has not provided any conveyance suitably adapted for transporting large numbers of multi-legged objects.

The invention provides a conveyance for transporting multi-legged objects such as music stands in a compactly nested arrangement requiring no disassembly of individual pieces.

According to a preferred embodiment of the invention, this conveyance comprises a hand-drawn carriage equipped with suitable wheels for movement over a floor surface, and a retainer structure connected to the carriage for movement therewith. Such retainer structure can be either integral with the carriage, or can be constructed so as to be separable as a unit from the carriage and releaseably connected thereto.

The retainer structure includes a plurality of elongated channels which receive and engage the legs of the objects to be transported and thereby secure the objects upon the carriage during movement thereof. These channels are arranged in an offset but parallel relation so that the objects are supported in a somewhat tilted attitude which allows nesting together of adjacent objects in a common group.

In those embodiments of the invention featuring a retainer structure that is separable from the carriage and releaseably connected thereto, the carriage element can be any conveniently available hand truck, dolly, wagon or the like, to which the retainer structure can be fastened. Thus, the invention offers a choice between embodiments in which the carriage and retainer structure combination is inseparable and constitutes a special-purpose conveyance, and those embodiments in which a general-purpose carriage is converted into a special-purpose conveyance by the addition of the retainer structure.

For a better understanding of the invention, and its many uses and advantages, reference should be had to the accompanying drawing and following detailed description thereof.

BRIEF DESCRIPTION OF THE DRAWING

In the drawing:

FIG. 1 is a perspective view of a conveyance according to a preferred embodiment of the invention, which is particularly adapted for transporting three-legged music stands.

FIG. 2 is a side elevation view of a conveyance according to another embodiment of the invention, in which the retainer structure is separable as a unit from the carriage.

FIG. 3 is a plan view of the conveyance shown in FIG. 2.

FIG. 4 is a sectional elevation view of the conveyance shown in FIG. 2 as taken along line 4—4 therein.

DESCRIPTION OF PREFERRED EMBODIMENTS OF THE INVENTION

In FIG. 1 there is shown a conveyance 10 equipped with a plurality of caster wheels 19 so as to be easily moveable over a floor surface (not shown) and provided with a retainer structure 11 that particularly adapts conveyance 10 for transporting a plurality of generally similar three-legged music stands 12 (shown in phantom).

Retainer structure 11 has a pair of elongated, inwardly facing channels 13 and 15 joined at their opposite ends to a pair of angle-section bracing members 14 so as to form a structure 11 generally rectangular in plan form. Approximately midway between channels 13 and 15, an I-beam 16 is connected at its opposite ends to bracing members 14. A pair of upturned channels 17 are connected at their opposite ends to the undersides of bracing members 14, each channel 17 being located intermediate between I-beam 16 and a corresponding one of the channels 13 and 15.

Casters 19 are expediently attached to the undersides of channels 17, and a pair of handles 18 are conveniently connected to channels 13, 15 at opposite ends of structure 11.

The channels 13, 15, 17, bracing members 14, I-beam 16 and handles 18 are preferrably metal and are selected from commercially available extruded or rolled shapes for economical assembly into structure 11 as by welding.

Conveyance 10 can be regarded basically as the combination of a retainer structure 11 to which carriage means, such as the set of four caster wheels 19, are connected to give easy mobility, and handles 18 are added to facilitate pushing or pulling conveyance 10 from place to place.

The particular arrangement of channels 13, 15, 17 and I-beam 16 in accordance with the invention makes conveyance 10 a special-purpose vehicle adapted to transport two groups of music stands 12 stacked in two horizontal rows with the adjacent music stands 12 in each row nested together to increase the number of stands 12 that can be carried with a retainer structure of a given plan area.

Channels 13, 15, 17 and I-beam 16 extend lengthwise in substantially parallel, spaced-apart relation to one another, the I-beam 16 being equivalent to two U-section channels (not shown) placed back-to back, in that one trough of I-beam 16 faces the trough of channel 15, and the other trough of I-beam 16 faces the trough of channel 13.

For retaining three-legged music stands 12, the channel 13, the trough of I-beam 16 facing channel 13, and the channel 17 between I-beam 16 and channel 13 define a set of three channel surfaces for holding one group of stands 12. The trough of I-beam 16 facing channel 15, the other channel 17, and channel 15 define another set of three channel surfaces for holding a second group of stands 12.

Within each set of channel surfaces, each channel is disposed to receive and engage the end portion of a corresponding leg of each object in the associated group of objects, as for example, channel 13 receives leg 20 of each stand 12, channel 17 receives leg 21 of each stand 12, and the right trough of I-beam 16 receives leg 22 of each stand 12.

Because channels 17 are positioned at a distance below their respectively associated other pairs of channels in each set of three, the stands 12 are supported in a correspondingly tilted attitude that allows nesting together of adjacent stands 12 with the leg 21 of one stand 12 extending under the next stand 12. This provides an arrangement whereby the stands 12 can be easily stacked and removed but will not fall off the conveyance 10 during transport since the channel surfaces retaining legs 20 and 22 prevent any sideways tip over and the tilted nesting configuration prevents tip over in longitudinal planes. The channels 17 preferrably have a depth sufficient to allow the leg 21 end portion of the first stand 12 in each row to be slipped under a bracing member 14 for better security against tip over.

In FIGS. 2, 3, and 4 there is exemplified another conveyance 100 constructed in accordance with the invention, and which uses a carriage 101 that is a general-purpose, prior art hand truck equipped with a generally rectangular platform 102 and a plurality of wheels 103.

Conveyance 100 is adapted for the same special-purpose use, namely, the transport of three-legged music stands 12, by the connection to carriage platform 102 of a retainer structure 111 that is somewhat similar to the retainer structure 11, in that structure 111 has channels 113, 115, 117 and an I-beam 116 generally similar to corresponding counterparts in structure 11, but has transverse bracing members 114 that are provided with several drill holes 120 for bolting to respective angle-section beams 121 that set against platform 102 and overhang the lateral edges thereof. The ends of each beam 121 are drilled to accept bolts 122 that extend below the underside of platform 102 and pass through a similarly drilled bar 123. When the bolts 122 are tightened, each beam 121 and bar 123 combination grips platform 102 to clamp structure 111 thereto. Thus, Structure 111 is releaseably connected at each end to the platform 102 by the fastening means comprising beams 121, bars 123, bolts 122 and the bolts 124 connecting beams 121 to bracing members 114.

It should be noted that the concept of the invention is not limited to any specific means or manner of securing retainer structure 111 to carriage 101 for movement therewith and so as to be separable therefrom as a unit. Other equivalent techniques that will accomplish the same result can also be used.

Also within the contemplation of the invention is an embodiment wherein the transverse bracing members 114 are omitted and the channel surface elements 113, 115, 116 and 117 are individually fastened to platform 102 as by bolts, etc., using any conventional means, such as spacer blocks (not shown) to attain the elevation differential between the channels 117 that receive legs 21 of stands 12, and the other channel elements 113, 115, 116. However, such proposed configuration is substantially equivalent to the design of conveyance 10 and does not offer the advantages of the conveyance 100. With the conveyance 100, it is only necessary to open the four bolts 122 and lift off retainer structure 111 in order to restore the carriage 101 to its original, general-purpose configuration.

What is claimed is:

1. A conveyance for transporting similar objects each having multiple protruding legs, which comprises a carriage disposed for movement over a floor surface, and a retainer structure connected to said carriage for movement therewith, said retainer structure including at least one set of three parallel elongated channels to accommodate the transport of a group of similar three-legged objects, each of said channels being disposed to receive and supportingly engage the end portion of a corresponding leg of each object in said group, two of said channels in the set having respective openings facing laterally toward each other and the third channel in the set being located between said two channels at a distance therebelow and having an opening facing upwardly to support said objects in a correspondingly tilted attitude for nesting together of adjacent objects in the group; said two channels each having a flange disposed to overhang the end portion of the leg received by the channel to constrain such leg against escape from the channel.

2. In a conveyance adapted for movement over a floor surface, the improvement which comprises means defining a retainer structure having a first set of three channel surfaces for holding one group of three-legged objects, and a second set of three channel surfaces for holding another group of three-legged objects, all of said channel surfaces extending in generally parallel relation to one another; two channel surfaces of each set defining respective openings facing laterally toward each other and the third channel surface of each set being located between said two channel surfaces at a distance therebelow and defining an opening facing upwardly to support the objects of the corresponding group in a tilted, nested together arrangement, said two channel surfaces of each set each defining a flange positioned to overhang the ends of legs of such objects received by those channel surfaces to constrain such legs against escape therefrom.

3. The improvement according to claim 2 wherein said retainer structure includes a structural member which defines both a channel surface of said first set, and a channel surface of said second set.

* * * * *